Jan. 6, 1970     A. L. SMITH     3,488,170

FIRE ARRESTER

Filed Aug. 7, 1967

Alonzo L. Smith
INVENTOR.

BY

ATTORNEYS

United States Patent Office 3,488,170
Patented Jan. 6, 1970

3,488,170
FIRE ARRESTER
Alonzo L. Smith, P.O. Box 66252, Houston, Tex. 77006;
Barbara Smith, adminstratrix of said Alonzo L. Smith, deceased
Filed Aug. 7, 1967, Ser. No. 658,940
Int. Cl. F17d 3/00
U.S. Cl. 48—192     3 Claims

ABSTRACT OF THE DISCLOSURE

A fire arrester system for a blowoff line having valve means connected to a low spot where liquids collect in a gas pipeline. The arrester surrounds the end of the blow off line and mixes atomized low pressure water with the stream from the gas pipeline blowoff line in a sufficient ratio to prevent the possibility of fire.

---

Figure 1:
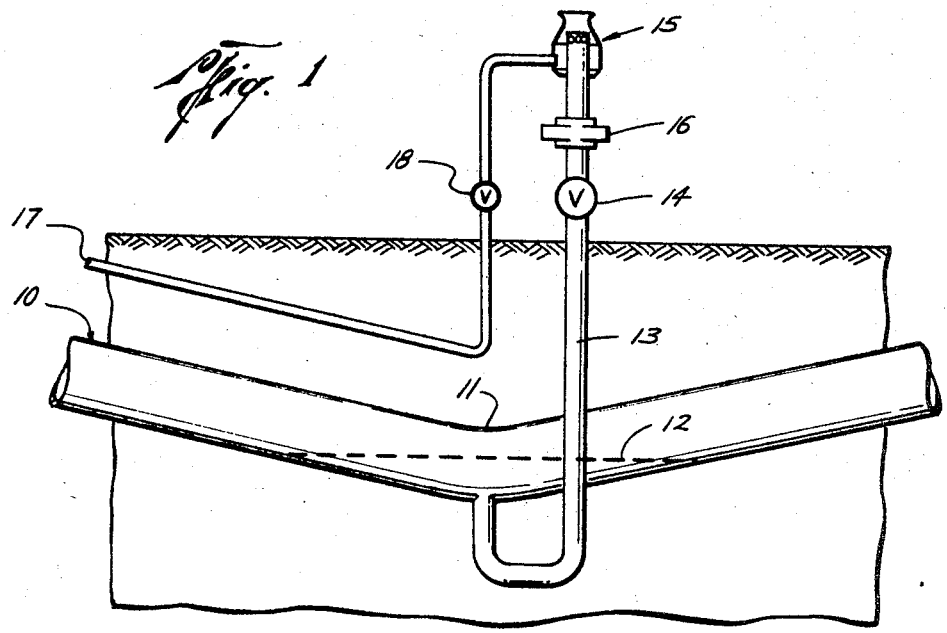

This application discloses method and apparatus for introducing water into a stream from a blowoff line from a gas pipeline to prevent or extinguish fires.

Gas pipelines always contain a number of low spots at which liquids collect. This collection of liquids reduces the effective diameter of the pipe and its capacity to deliver gas. It is customary to place blowoff lines at these low spots. Periodically the valve controlling the blowoff line is opened to permit the gas pressure within the line to blow out the accumulated liquids. As with any hydrocarbon stream, there is always danger of fire. This is not too critical in open country. However, low spots sometimes occur in highly populated areas and the danger of fire is such that every precaution must be exercised to prevent fires at these blowoff lines.

An object of this invention is to provide a well fire arrester or preventer which will mix atomized low-pressure water with the stream from a gas pipeline blow-off line in a sufficient ratio to prevent the possibility of fire.

Another object is to provide a method and apparatus for preventing fire at the outlet of a gas pipeline blow-off line in which the escaping high-pressure gas tends to atomize and to draw the low-pressure water from a city system into the escaping gas stream in sufficient volume that the gas stream will not support combustion.

Other objects, features and advantages of this invention will be apparent from the drawings, the specification and the claims.

Figure 2:
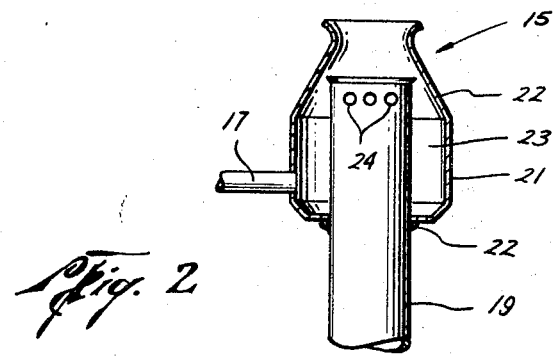

In the drawing:

FIGURE 1 is a schematic illustration of this invention applied to a pipeline; and, FIGURE 2 is a view on an enlarged scale of the fire arrester at the top of the blowoff pipe.

In practicing the method of this invention, low-pressure water from a city system is brought to the outlet end of a conventional blow off pipe from a gas pipeline. The water is caused to surround the pipe adjacent its outlet and to atomize and mix with gas from the blowoff pipe at such outlet.

In accordance with the preferred form of this invention, the escaping gas stream from the high-pressure gas line is caused to draw the water from the low-pressure city system into the gas stream while atomizing the water to thus load the gas stream with sufficient water that it will not support combustion.

Referring to FIGURE 1, a pipeline indicated at 10 has a low spot 11 therein. Liquids will accumulate in this low spot, as represented by the liquid 12. Conventionally, a blowoff pipe 13 is connected to the low spot 11 and the outlet end of pipe 13 is exposed to atmosphere. By opening the valve 14 in the blowoff pipe, the pressure within line 10 will drive liquid 12 out through the pipe. In order to prevent the possibility of fire during the blowoff operation, a fire arrester indicated generally at 15 is attached to the blowoff pipe 13 by the conventional pipe coupling 16. A water line 17 delivers water from a city system, conventionally about 50 pounds, to the fire arrester 15 through the control valve 18.

The arrester may take any form which will atomize the water and throughly mix it with the escaping stream.

Referring to FIGURE 2, the preferred arrester includes the pipe 19 which is attached to a blowoff pipe 13 by the coupling 16. A housing 21 surrounds pipe 19 and is sealingly secured thereto at its bottom end as by weld 22. The housing 21 is radially spaced from pipe 19 to provide a distribution chamber 23. Preferably the housing 21 is necked down in an upwardly and inwardly frusto-conical manner as shown at 22. The smallest point of the necked-down section is approximately equal to the inner diameter of pipe 19. Preferably a plurality of holes 24 are provided in the upper end of pipe 19. This structure will cause the escaping stream to draw water from the distribution chamber, atomize the water and mix it with the stream.

When it is desired to open the blowoff line 13, the valve 18 is first opened to deliver city water to the distribution chamber 23 so that the water is available about the entire circumference of the upper end of pipe 19. The valve 14 is then opened to permit line pressure from the pipeline 10 to blow the accumulated liquids out of the line. As these fluids are blown out of pipe 19, they mix with the atomized incoming city water in such volume that the mixture will not support combustion.

In a recent demonstration, a 2-inch line was tapped into a pipeline under pressure of 640 to 680 pounds per square inch. The 2-inch line had a capacity of five to six million feet per day under these circumstances. A 100-gallon tank was partially filled with water and placed under pressure of 80 pounds. The water tank was approximately 250 feet away from the outlet of the 2-inch line, but the 250-foot line was full of water to the 2-inch line. The 2-inch line was opened and the escaping gas was ignited. The valve controlling the water line to a nozzle on top of the 2-inch line, of the design shown in FIGURE 1, was opened. Surprisingly, it was found that only about a gallon of water was required to extinguish the flame. In experimentation it was found that with the escaping gas ignited, the water valve when cracked and gradually opened would result in the bottom of the fire rising in response to increasing the flow through the water line. As the volume of water was increased, the flame was gradually snuffed out.

It might be observed that in accordance with this invention the low-pressure city water and high-pressure pipeline gas are admixed at the outlet of the pipe 19. They could not be admixed at a point upstream because the pressure of the gas in the blowdown pipe 19 is sufficiently great that it would back up in line 17. In other words, it is only at or immediately adjacent to the outlet of pipe 19 that the pressure of the escaping gas stream is reduced to a point at which it will take on the low-pressure water. As the gas escapes from pipe 19, it picks up and atomizes the water. The holes 24 tend to load the inner section of the escaping column of fluid.

The foregoing disclosure and description of the invention is illustrative and explanatory thereof and various changes in the apparatus and method may be made within the scope of the appended claims without departing from the spirit of the invention.

What is claimed is:
1. In a fire arrester system for a gas pipeline:
a blowoff line having valve means therein connected to a low spot in a gas pipeline;

fire arrester means for atomizing water comprising:
an inner pipe connected to and forming a continuation of the blowoff line;
a housing extending circumferentially about the pipe;
and means forming a fluid-tight connection between the bottom of the housing and said pipe;
said housing spaced radially from said pipe to form a distribution chamber therebetween and extending upwardly beyond the free end of the pipe to provide fluid communication between said chamber and the free end of said pipe about its entire circumference;
a low-pressure source of water;
and conduit means having valve means therein connecting the low-pressure source of water to said chamber.

2. The fire arrester system of claim 1 wherein the housing of the fire arrester has its upper end necked down to approximately the diameter of said pipe.

3. The method of preventing fires at the outlet of a gas pipeline blowoff line comprising:
surrounding the blowoff line adjacent its outlet end with water from a low-pressure water distribution system;
and simultaneously atomizing and introducing water into the stream from the gas pipeline about the entire circumference of the stream to prevent the stream from supporting combustion.

References Cited

UNITED STATES PATENTS 2,988,150    6/1961    Smith _____ 137—142 X

MORRIS O. WOLK, Primary Examiner

R. E. SERWIN, Assistant Examiner

U.S. Cl. X.R.

169—2